US012756061B2

(12) United States Patent
Chagarlamudi et al.

(10) Patent No.: US 12,756,061 B2
(45) Date of Patent: Oct. 6, 2026

(54) VEHICLE HAVING AUTOMATIC VENT GAS DISCHARGE DOORS

(71) Applicant: FCA US LLC, Auburn Hills, MI (US)

(72) Inventors: Venkata K. M. Chagarlamudi, Rochester Hills, MI (US); Sreekanth Surapaneni, Oakland, MI (US); Uday K. Mahakali, Novi, MI (US)

(73) Assignee: FCA US LLC, Auburn Hills, MI (US)

( * ) Notice: Subject to any disclaimer, the term of this patent is extended or adjusted under 35 U.S.C. 154(b) by 239 days.

(21) Appl. No.: 18/606,186

(22) Filed: Mar. 15, 2024

(65) Prior Publication Data

US 2025/0293387 A1 Sep. 18, 2025

(51) Int. Cl.

| | |
|---|---|
| ***H01M 50/375*** | (2021.01) |
| ***B60L 50/64*** | (2019.01) |
| ***B60L 58/24*** | (2019.01) |
| ***B62D 25/20*** | (2006.01) |
| ***B62D 25/24*** | (2006.01) |
| ***B62D 35/02*** | (2006.01) |
| ***E05B 81/04*** | (2014.01) |

(Continued)

(52) U.S. Cl.

CPC ........... *H01M 50/375* (2021.01); *B60L 50/64* (2019.02); *B60L 58/24* (2019.02); *B62D 25/2072* (2013.01); *B62D 25/24* (2013.01); *B62D 35/02* (2013.01); *E05B 81/04* (2013.01); *E05B 81/56* (2013.01); *E05B 83/00* (2013.01); *E05F 1/1207* (2013.01); *H01M 10/486* (2013.01); *H01M 50/333* (2021.01); *H01M 50/358* (2021.01); *B60L 2240/545* (2013.01); *E05Y 2900/53* (2013.01); *H01M 2220/20* (2013.01)

(58) Field of Classification Search

CPC .. H01M 50/30; H01M 50/317; H01M 50/333; H01M 50/375; H01M 50/358; H01M 10/48; H01M 10/482; H01M 10/486; H01M 10/52; H01M 10/60; H01M 10/61; H01M 10/613; B60L 2240/545; B60L 50/50; B60L 50/60; B60L 50/61; B60L 50/62; B60L 50/64; B60L 58/10; B60L 58/24; B60L 58/26; B62D 25/20; B62D 25/24; B62D 25/2072; B62D 35/02; B62D 35/005; B62D 35/007; B62D 35/008

See application file for complete search history.

(56) References Cited

U.S. PATENT DOCUMENTS

2021/0261329 A1* 8/2021 Ramm ...................... E05F 3/14
2021/0288378 A1* 9/2021 Okada ................ H01M 10/482

(Continued)

FOREIGN PATENT DOCUMENTS

DE 102021130405 A1 * 5/2023 ............... B60K 1/04

*Primary Examiner* — Sara J Lewandroski

(74) *Attorney, Agent, or Firm* — Jeremy J. Klobucar

(57) ABSTRACT

A door is connected to a skid plate or belly pan or vehicle at a location that overlaps an outlet port formed in the skid plate or belly pan. The door is movable from a closed position that obstructs the outlet port to an open position where the door does not obstruct the outlet port by an actuator that is in communication with a controller, wherein the controller is configured to communicate an instruction to the actuator to move the door from the closed position to the open position based on a signal indicative of a temperature or a pressure within a housing of a battery pack received from at least one sensor positioned in the housing.

14 Claims, 7 Drawing Sheets

(51) Int. Cl.

| | |
|---|---|
| ***E05B 81/56*** | (2014.01) |
| ***E05B 83/00*** | (2014.01) |
| ***E05F 1/12*** | (2006.01) |
| ***H01M 10/48*** | (2006.01) |
| ***H01M 50/333*** | (2021.01) |
| ***H01M 50/358*** | (2021.01) |

(56) References Cited

U.S. PATENT DOCUMENTS

2023/0135353 A1* 5/2023 Hadler ................ H01M 50/213
429/82
2023/0207919 A1* 6/2023 Kim .................. H01M 10/6563
429/62
2024/0034411 A1* 2/2024 Maltisotto ............. H01M 50/30
2024/0313334 A1* 9/2024 Dittmann ............ H01M 50/333

* cited by examiner

VEHICLE HAVING AUTOMATIC VENT GAS DISCHARGE DOORS

FIELD

The present disclosure relates to a vehicle having automatic vent gas discharge doors.

BACKGROUND

This section provides background information related to the present disclosure which is not necessarily prior art.

Vehicles with electric propulsion systems are becoming increasingly more common. Some electrically propelled vehicles include an electric drive motor at each wheel of the vehicle, and some electrically propelled vehicles include a front electric drive motor for rotating the front wheels of the vehicle and a rear electric drive motor for rotating the rear wheels of the vehicle. In either case, the electric drive motors receive power from a battery pack that includes a plurality of battery cells therein. Example battery cells include lithium-ion battery cells and lithium-metal battery cells.

Lithium-ion and lithium-metal battery cells sometimes undergo a process called thermal runaway during failure conditions. Thermal runaway may result in a rapid increase of battery cell temperature accompanied by the release of various gases, which in some cases may be flammable. These flammable gases may be ignited by the high temperature of the battery, which may result in a fire. Accordingly, in the event of a thermal runaway, it is desirable that the vehicle include features that assist in mitigating the thermal runaway event.

SUMMARY

This section provides a general summary of the disclosure, and is not a comprehensive disclosure of its full scope or all of its features.

According to a first aspect of the present disclosure, there is provided a vehicle that includes a battery pack including a housing; at least one battery cell located in the housing; at least one sensor positioned in the housing that is configured to generate a signal indicative of a temperature or a pressure within the housing; a skid plate or belly pan located proximate the housing; and a controller in communication with the at least one sensor, wherein the housing includes at least one vent that is configured to permit gases generated by the at least one battery cell to escape the housing, and at least one manifold connected to the housing that is in fluid communication with the at least one vent and configured to direct the gases through an outlet port formed in the skid plate or belly pan; wherein a door is connected to the skid plate or belly pan at a location that overlaps the outlet port, the door being movable from a closed position that obstructs the outlet port to an open position where the door does not obstruct the outlet port by an actuator in communication with the controller; and wherein the controller is configured to communicate an instruction to the actuator to move the door from the closed position to the open position based on the signal indicative of the temperature or pressure within the housing received from the at least one sensor.

According to the first aspect, the at least one sensor is a temperature sensor configured to generate the signal indicative of the temperature within the housing.

According to the first aspect, the vehicle may also include a pressure sensor positioned in the housing that is configured to generate the signal indicative of the pressure within the housing.

According to the first aspect, the door includes a first panel attached to the skid plate or belly pan, the first panel including an opening that is aligned with the outlet port.

According to the first aspect, the door includes a second panel attached to the first panel by a hinge.

According to the first aspect, a first coil spring is wound around the hinge that is configured to bias the second panel away from the outlet port.

According to the first aspect, the second panel includes a latching mechanism having a latch that is pivotably attached to the second panel and configured to pass through the outlet port and mate with the skid plate to maintain the door in the closed position.

According to the first aspect, the actuator includes an actuator pin that is configured to contact the latch and disengage the latch from the skid plate to permit the door to move to the open position.

According to the first aspect, when the door is in the open position, the door is configured as a shield that prevents or at least substantially minimizes the gases passing through the outlet port from travelling in a predetermined direction.

According to the first aspect, when the door is in the closed position that obstructs the outlet port, the door is configured to improve aerodynamic properties of the vehicle and prevent the outlet port from becoming clogged.

According to a second aspect of the present disclosure, there is provided a method for permitting gases generated during a thermal runaway event to escape a battery pack of a vehicle that is located proximate a skid plate or belly pan of the vehicle, the method may include communicating a signal indicative of a temperature or a pressure within the battery pack to a controller, the signal being generated by at least one sensor positioned within the battery pack; determining with the controller, based on the signal indicative of the temperature or the pressure within the battery pack, whether at least one battery cell located in the battery pack is undergoing a thermal runaway event; after determining with the controller that at least one battery cell located in the battery pack is undergoing the thermal runaway event, communicating an instruction from the controller to an actuator to open a door connected to the skid plate or belly pan of the vehicle; wherein the battery pack includes a housing that includes at least one vent that is configured to permit gases generated by the at least one battery cell to escape the housing, and at least one manifold connected to the housing that is in fluid communication with the at least one vent and configured to direct the gases through an outlet port formed in the skid plate or belly pan; wherein the door is connected to the skid plate or belly pan at a location that overlaps the outlet port, and the door is movable by the actuator from a closed position that obstructs the outlet port to an open position where the door does not obstruct the outlet port.

According to the second aspect, the at least one sensor is a temperature sensor configured to generate the signal indicative of the temperature within the housing.

According to the second aspect, a pressure sensor may be positioned in the housing that is configured to generate the signal indicative of the pressure within the housing.

According to the second aspect, the door includes a first panel attached to the skid plate or belly pan, the first panel including an opening that is aligned with the outlet port.

According to the second aspect, the door includes a second panel attached to the first panel by a hinge.

According to the second aspect, a first coil spring is wound around the hinge that is configured to bias the second panel away from the outlet port.

According to the second aspect, the second panel includes a latching mechanism having a latch that is pivotably attached to the second panel and configured to pass through the outlet port and mate with the skid plate to maintain the door in the closed position.

According to the second aspect, the actuator includes an actuator pin that is configured to contact the latch and disengage the latch from the skid plate to permit the door to move to the open position.

According to the second aspect, when the door is in the open position, the door is configured as a shield that prevents or at least substantially minimizes the gases passing through the outlet port from travelling in a predetermined direction.

According to the second aspect, when the door is in the closed position that obstructs the outlet port, the door is configured to improve aerodynamic properties of the vehicle and prevent the outlet port from becoming clogged.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
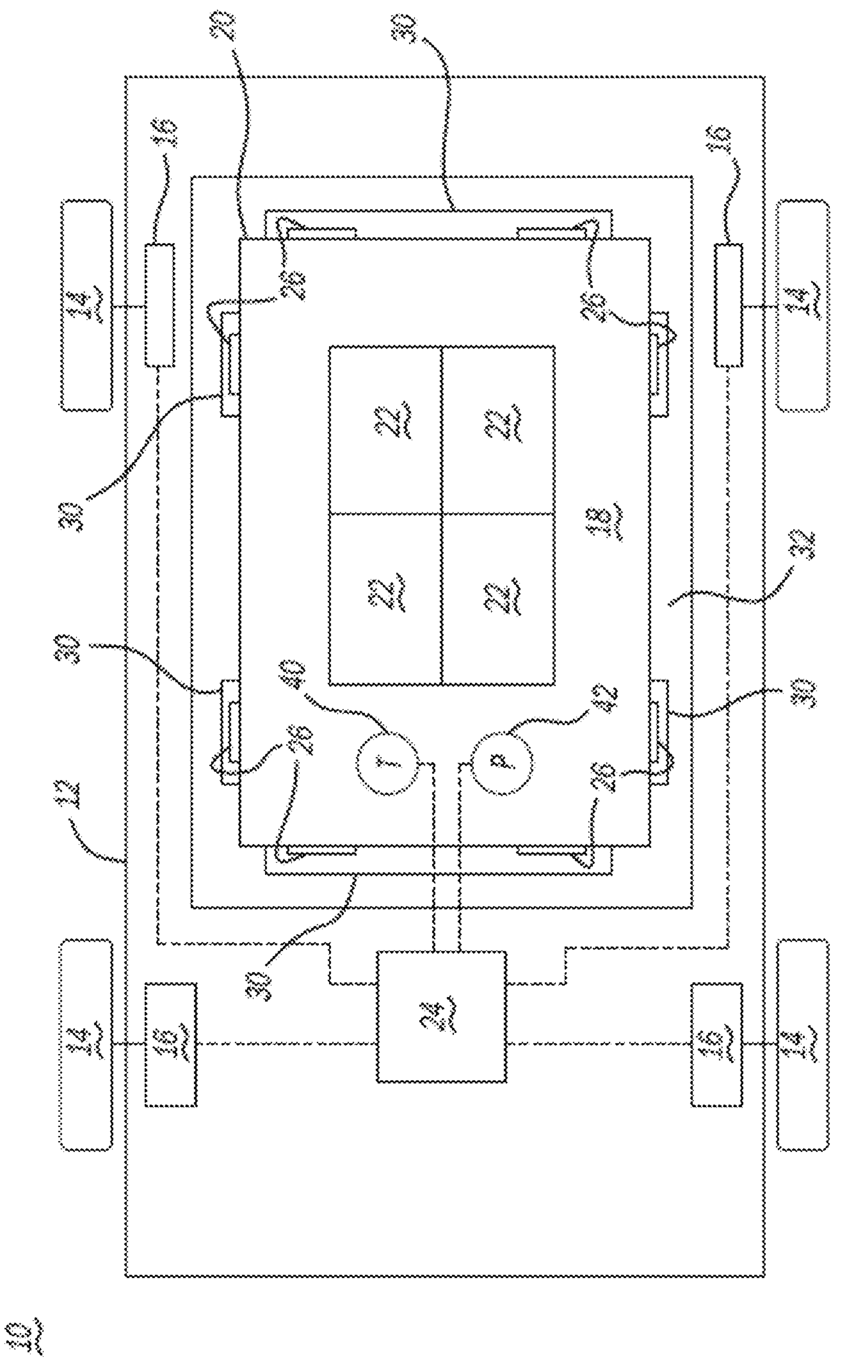
FIG. 1 is a schematic view of an example vehicle according to a principle of the present disclosure.

FIG. 1 schematically illustrates an example electric vehicle 10 according to the present disclosure. Vehicle 10 includes a body 12, a plurality of wheels 14. In the illustrated embodiment, each wheel 14 is driven using a respective electric drive module 16 that receives electric power from a battery pack 18 having a housing 20 that encases a plurality of battery cells 22. Example battery cells 22 include lithium-ion battery cells, lithium-metal battery cells, and combinations thereof. It should be understood, however, that other types of battery cells 22 known to one skilled in the art may be used, without limitation. Housing 20 is preferably formed of a rigid metal material (e.g., steel, aluminum, and the like) that is resistant to puncture and is non-flammable.

While FIG. 1 illustrates four electric drive modules 16 such that each wheel 14 can be driven by a single electric drive module 16, it should be understood that vehicle 10 may include a single electric drive module 16 for driving a pair of wheels 14 (e.g., for driving the pair of front wheels 14 or the pair of rear wheels 14), or may include a pair of electric drive modules 16 with one of the electric drive modules 16 driving the front pair of wheels 14 and another of the electric drive modules 16 driving the rear pair of wheels 14. Regardless of the configuration selected, it should be understood that electric drive modules 16 receive a voltage or current from battery pack 18 that is utilized by the electric drive module 16 to drive the wheels 14 of the vehicle 10.

Vehicle 10 also includes a controller 24 in communication with each of the drive modules 16 and in communication with the battery pack 18. Controller 24 may be used to control electric drive modules 16 to control a speed of vehicle 10, and may also be used to monitor and/or communicate with various systems of vehicle such as an HVAC system (not shown), a vehicle braking system (not shown), and any other system that may be part of vehicle 10.

As noted above, battery cells 22 may sometimes undergo a process called thermal runaway during failure conditions of the battery cell(s) 22. Thermal runaway may result in a rapid increase of battery cell temperature accompanied by the release of various gases, which in some cases may be flammable. Example gases that may be released during a thermal runaway event include hydrogen ($H_2$), carbon monoxide (CO), carbon dioxide ($CO_2$), and various hydrocarbons including, but not limited to, methane, ethane, ethylene, acetylene, propane, cyclopropane, and butane. As these gases are released and the temperature of battery pack 18 increases, the pressure within battery pack 18 also increases.

Figure 2:
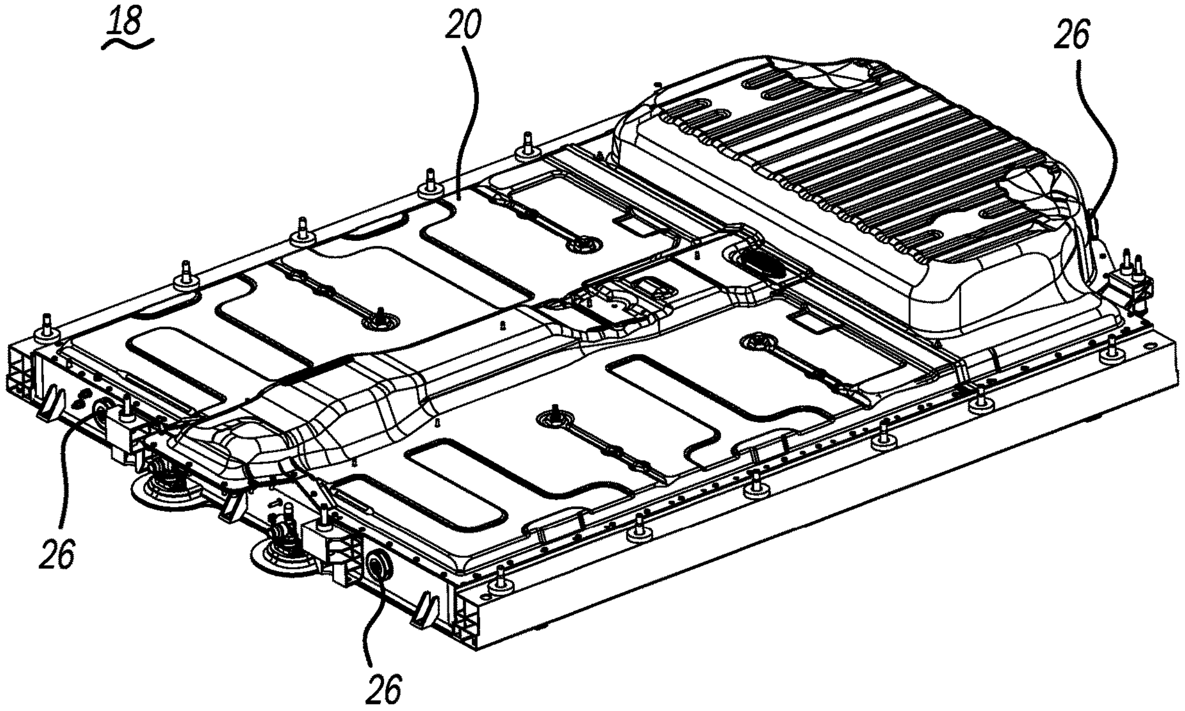
FIG. 2 is a perspective view of an example battery pack that can be used in the vehicle of FIG. 1.
Figure 3:
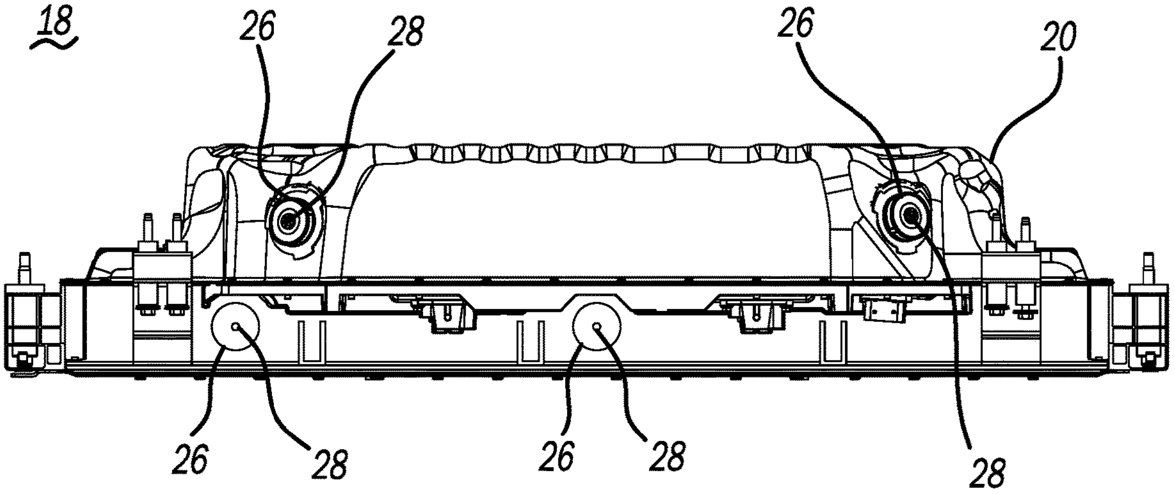
FIG. 3 is a front-perspective view of the example battery pack illustrated in FIG. 2.

Now referring to FIGS. 2 and 3 with continued reference to FIG. 1, it can be seen that housing 20 of battery pack 18 includes a plurality of discharge vents 26 that permit the pressure and gases to escape housing 20 during a thermal runaway event. Discharge vents 26 may each include a valve 28 that may be a one-way valve and opens upon a predetermined pressure threshold being generated within housing 20. For example, if the pressure within housing 20 reaches 100 millibars the valves 28 may open and permit the gases within housing 20 to exit the battery pack 18. Discharge vents 26 may be in communication with various conduits (not shown) located in battery pack 18, which direct the gases generated during the thermal runaway event to the discharge vents 26 to be expelled from housing 20.

While housing 20 may include discharge vents 26 including valves 28 for releasing the gases from battery pack 18, the gases released from battery pack 18 may collect beneath the vehicle 10. If the gases are at a sufficient temperature, the gases may combust after exiting battery pack 18 at a location beneath vehicle 10. If this occurs, there is the potential for other features of the vehicle 10 to also combust including, for example, the tires (not shown) of the wheels 14, hoses (not shown), vehicle brakes (not shown) and other features.

Figure 4:
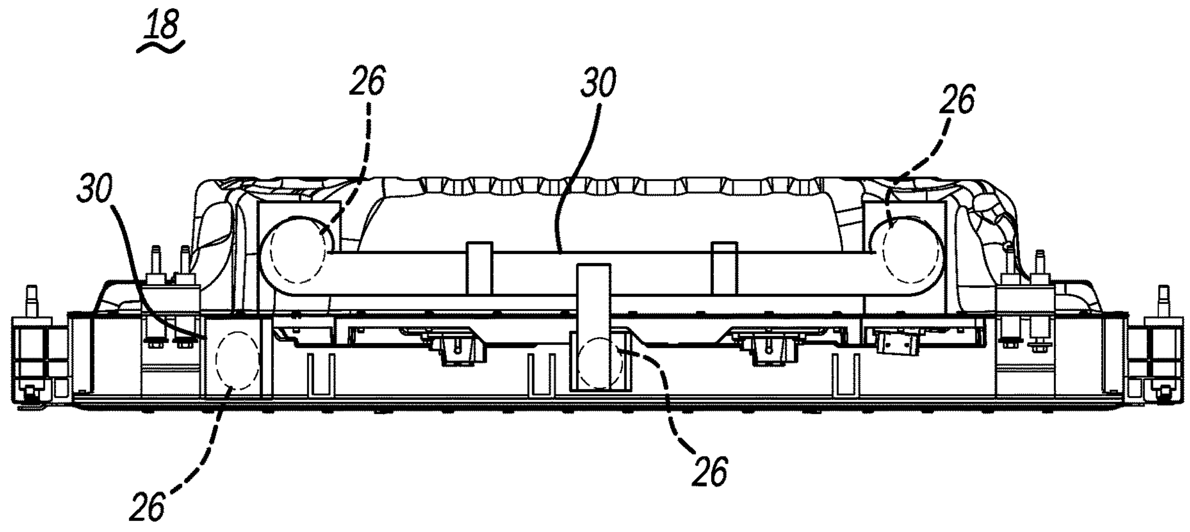
FIG. 4 is a front perspective view of the example battery pack illustrated in FIG. 2, including manifolds for directing gases that may be emitted by the battery pack during a thermal runaway event.

In order to prevent, or at least substantially minimize, the gases that collect beneath vehicle 10 from being at a high temperature that can damage vehicle 10 or components of vehicle 10, it should be understood that battery pack 18 may also include manifolds 30 (FIGS. 1 and 4) attached to housing 20 of battery pack 18 and in communication with discharge vents 26 that collect and direct the gases generated during the thermal runaway event. Moreover, although not required, manifolds 30 may be configured to thermally treat the gases that are generated during the thermal runaway event, as will be described in more detail later.

Figure 5:
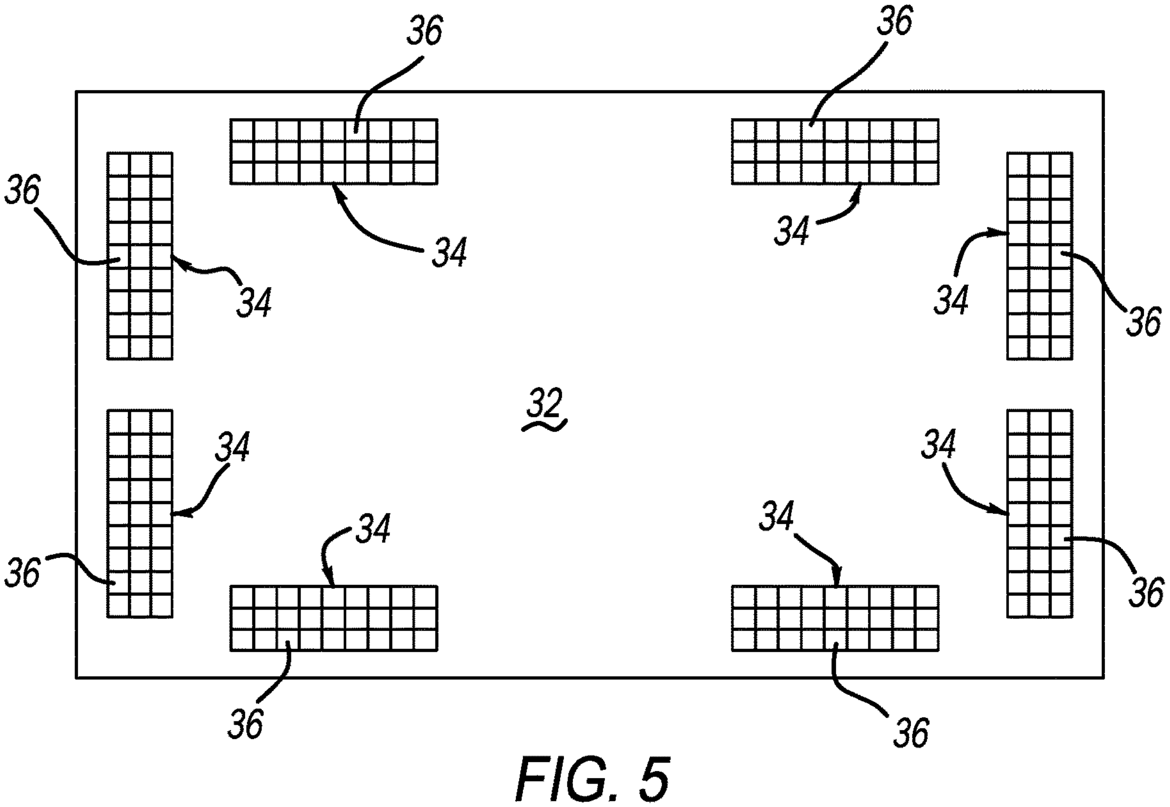
FIG. 5 is a schematic view of an example skid plate or belly pan of the vehicle illustrated in FIG. 1 that may be positioned between the battery pack and the ground.
Figure 6:
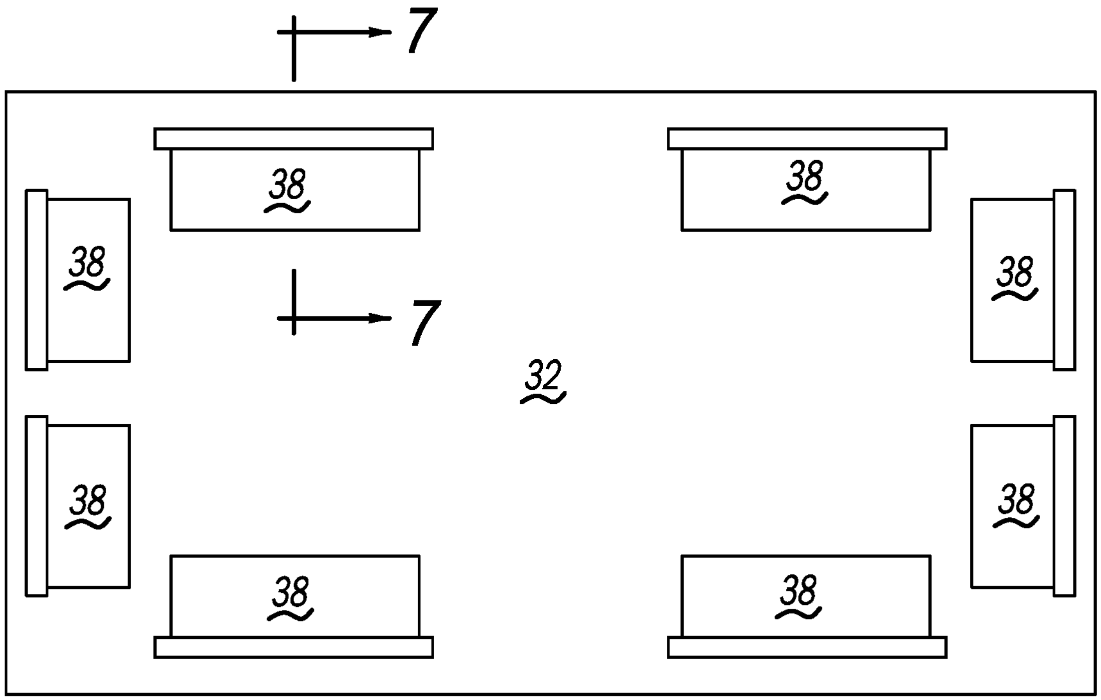
FIG. 6 is a schematic view of the example skid plate or belly pan illustrated in FIG. 5, having a door that cover outlet ports formed in the skid plate or belly pan.

Referring to FIGS. 1, 5, and 6, it can be seen that vehicle 10 includes a belly pan or skid plate 32 positioned beneath battery pack 18 that is configured to protect battery pack 18 during operation of vehicle 10. For example, if vehicle 10 drives over a large object that can damage (e.g., puncture or crack) battery pack 18, skid plate 32 can provide an additional amount of protection to battery pack 18 in addition to housing 20. Notwithstanding the amount of additional protection to battery pack 18 that skid plate 32 is designed to provide, it should be understood that skid plate 32 may act as a barrier that prevents the hot gases generated during thermal runaway to disperse away from the battery pack 18. Accordingly, at locations that correspond to locations of manifolds 30, it can be seen that skid plate 32 includes a plurality of groups 34 of outlet ports 36 that permit the hot gases carried by manifolds 30 to pass through skid plate 32 and away from battery pack 18. The outlet ports 36 may be formed skid plate 32, for example, by punching or stamping.

While outlet ports 36 may be necessary to avoid skid plate 32 from acting as a barrier that prevents the hot gases from being dispersed away from battery pack 18, it should also be understood that outlet ports 36 may become clogged with debris, ice, and the like during operation of vehicle 10. Moreover, it should be understood that during operation of vehicle 10 that air passing beneath vehicle 10 may enter the outlet ports 36 and increase the aerodynamic drag on vehicle. Skid plate 32, therefore, includes a plurality of doors 38 as shown in FIG. 6 that are pivotably attached to skid plate 32 that are configured to open in response to a potential thermal runway event being detected and permit the hot battery gases expelled through vents 26 that enter manifolds 30 to pass the outlet ports 36 and away from battery pack 18. Moreover, inasmuch as doors 38 cover outlet ports 36 during use of vehicle 10 when a thermal runaway event is not occurring (FIGS. 6 and 7), the outlet ports 36 are prevented from being clogged and air is prevented from entering the outlet ports 36 to improve the aerodynamic properties of vehicle 10.

Figure 7:
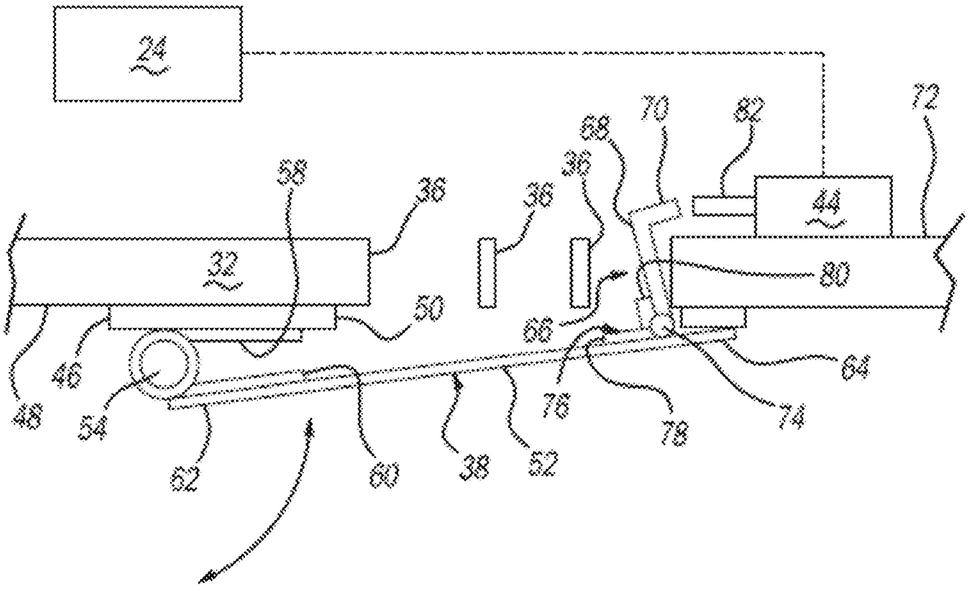
FIG. 7 is a cross-sectional view of the skid plate or belly pan along line 7-7 of FIG. 6.
Figure 8:
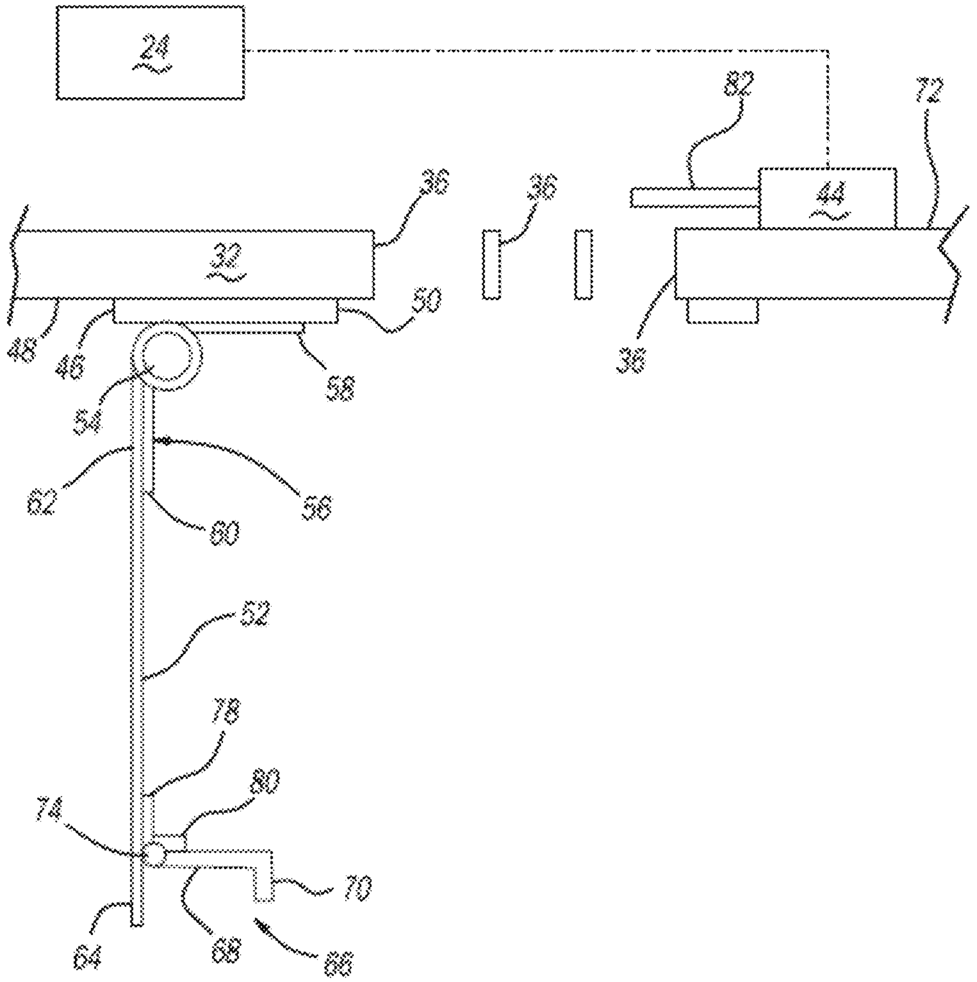
FIG. 8 is a cross-sectional view of the skid plate or belly pan along line 7-7 of FIG. 6, with the door in an open position.

As shown in FIGS. 7 and 8, doors 38 may be in communication with and opened using controller 24 when conditions are determined to exist within battery pack 18 that may be indicative of a thermal runaway event. In this regard, battery pack 18 may include at least one of a temperature sensor 40 that is positioned withing housing 20 and configured to generate and communicate to controller 24 signals indicative of temperature within housing 20 and a pressure sensor 42 that is positioned withing housing 20 and configured to generate and communicate to controller 24 signals indicative of pressure within housing 20. Preferably, battery pack 18 includes each sensor 40, 42. Based on signals received from sensors 40 and 42 that may indicate a thermal runaway event, controller 24 can communicate a signal to an actuator 44 that can open doors 38 such that outlet ports 36 are not obstructed by doors 38.

Referring to FIGS. 7 and 8, doors 38 include a first panel 46 that is fixed to a surface 48 of skid plate 32. First panel 46 may be fixed to skid plate 32 using any fastening method known to one skilled in the art including, for example, using fasteners (not shown), welding, brazing, and the like. Regardless of the manner in which first panel 46 is fixed to skid plate 32, it can be seen in FIG. 7 that first panel 46 includes an opening 50 that overlaps outlet ports 36 formed in skid plate 32 such that when door 38 is an open position (FIG. 8), gases that are generated during a thermal runaway event can escape.

Doors 38 also include a second panel 52 that is devoid of an opening such that when doors 38 are in the closed position (FIGS. 6 and 7), the outlet ports 36 are sealed. Put another way, when doors 38 are closed, air moving beneath vehicle 10 is restricted from entering outlet ports 36 such that the aerodynamic properties of vehicle 10 are improved. Moreover, when doors 38 are closed, debris, ice, snow, and the like are prevented or at least restricted from clogging outlet ports 36.

Figure 9:
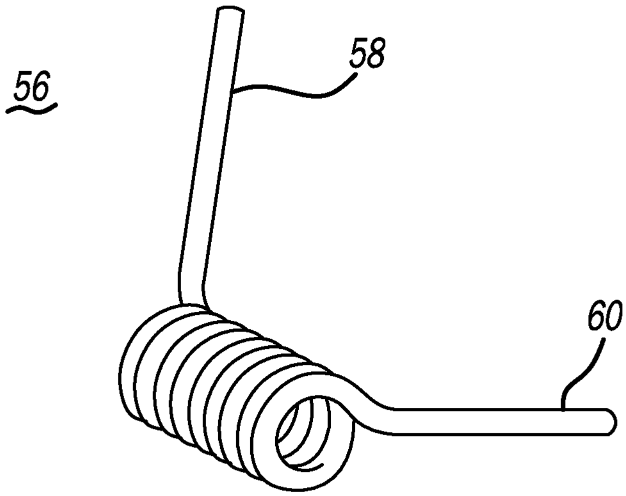
FIG. 9 is a perspective view of an example spring that is configured to bias the door to the open position shown in FIG. 8.

Second panel 52 is attached to first panel 46 by a hinge 54 such that second panel 52 can pivot relative to first panel 46. A first spring 56 can be used to bias doors 38 to the open position shown in FIG. 8. As can be seen in FIG. 9, with continued reference to FIGS. 7 and 8, first spring 56 may be a coil spring similar to that used in a conventional door hinge that is wound about hinge 54 and has a first end 58 engaged with first panel 46 and an opposite second end 60 engaged with second panel 52.

Second panel 52 includes a proximate end 62 that is attached to hinge 54 and a distal end 64 having a latching mechanism 66 that can be used to maintain door 38 in the closed position shown in FIG. 7. Latching mechanism 66 may include a latch 68 having a hook 70 that is configured to pass through one of the outlet ports 36 and engage with an upper surface 72 of skid plate 32. Latch 68 may be pivotably connected to distal end 64 using a pivot pin 74 and second spring 76 that is similar to first spring 56. That is, second spring 76 may be a coil spring wrapped around pivot pin 74 having one end 78 in engagement with second panel 52 and an opposite end 80 in engagement with latch 68 that biases latch 68 in a direction toward actuator 44.

Actuator 44 may include an electric motor (not shown) in communication with and configured to be controlled by controller 24. Actuator 44 also includes an actuator pin 82 that may be moved by the electric motor from a retracted position (FIG. 7) to an extended position (FIG. 8), wherein in the extended position the actuator pin 82 is configured to contact hook 70 and push latch 68 away from actuator 44 to a position where hook 70 is disengaged from upper surface 72 of skid plate 32. Once hook 70 has disengaged from skid plate 32, the biasing force exerted by first spring 56 forces second panel 52 of door 38 away from outlet ports 36 to open door 38 to the extended position shown in FIG. 8.

Figure 10:
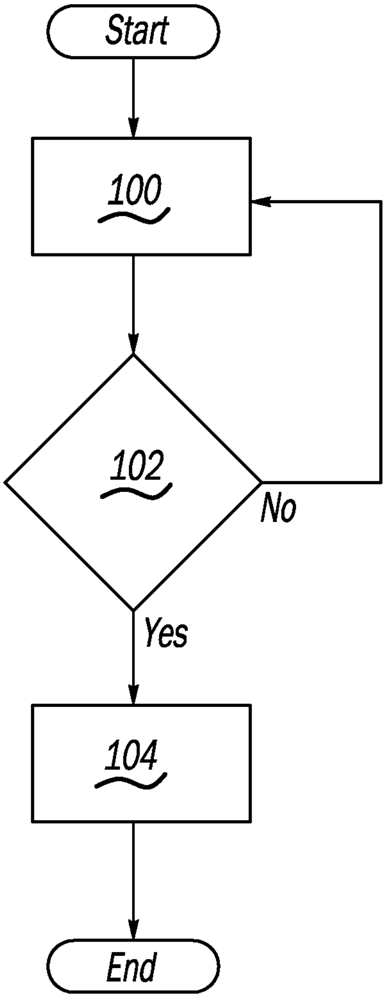
FIG. 10 is a flow chart of a method according to a principle of the present disclosure.

Now, referring to FIG. 10, operation of doors 38 will be described. During use of vehicle 10, controller 24 will be in communication with at least one of temperature sensor 40 and pressure sensor 42 and receiving signals indicative of temperature and pressure, respectively, of battery pack 18 (step 100). Upon receipt of a signal from either temperature sensor 40 or pressure sensor 42 that one of the cells 22 of battery pack 18 may be beginning to experience a thermal runaway event, controller 24 may determine that doors 38 need to be opened to permit gases generated during thermal runaway that are expelled through vents 26 into manifolds 30 to pass through outlet ports 36 formed in skid plate 32 (step 102). After it is determined that doors 38 need to be opened to un-obstruct outlet ports 36, controller 24 may send a signal to actuator 44 to actuate actuator pin 82 in a direction toward latch 68 to disengage latch 68 from skid plate 32 to permit door 38 to move from the closed position (FIG. 7) to the open position (FIG. 8) (step 104).

It should be understood that when doors 38 are in the open position shown in FIG. 8, doors 38 are configured to act as a shield that prevents or at least substantially minimizes the volatile gases being emitted through outlet ports 36 from travelling in a predetermined direction. For example, if outlet ports 38 provided in skid plate 32 are located proximate a location of vehicle 10 from which a passenger may seek to exit the vehicle 10, doors 38 can direct the gases being emitted from outlet ports 36 away from that location and assist in permitting the occupant to safely exit the vehicle 10. In another example, doors 38 may be used to shield various components of the vehicle 10 including, for example, high-voltage cables, brake components, and other features that may ignite when exposed to the high temperature gases that may be generated during thermal runway.

In addition, it should be understood that latching mechanism 66 is only an example and different latching mechanisms and actuators 44 are contemplated. The primary aspect to keep in mind is that doors 38 are maintained in a closed position to cover outlet ports 36 formed in skid plate 32 and prevent outlet ports 36 from becoming clogged to an extent that gases generated during thermal runaway cannot pass therethrough, and to prevent outlet ports 36 from negatively affecting the aerodynamic properties of vehicle 10. Other latching mechanisms 66 may include the use of electromagnets, spring-loaded sockets, and the like.

Finally, as noted above, manifolds 30 may be configured to thermally treat the gases that are generated during the thermal runaway event. In this regard, some of the manifolds 30 may include a plurality of cooling vents and deflectors for drawing and directing ambient air into the flow of hot battery exhaust gases, as described in U.S. patent application Ser. No. 18/452,013 filed Aug. 18, 2023, assigned to FCA US, LLC. The ambient air, when intermixed with the exhaust gases located in the manifold 30, assists in reducing a temperature of the exhaust gases as well as assists in diluting the exhaust gases.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:

a battery pack including a housing;

at least one battery cell located in the housing;

at least one sensor positioned in the housing that is configured to generate a signal indicative of a temperature or a pressure within the housing;

skid plate or belly pan located proximate the housing; and a controller in communication with the at least one sensor, wherein the housing includes at least one vent that is configured to permit gases generated by the at least one battery cell to escape the housing, and at least one manifold connected to the housing that is in fluid communication with the at least one vent and configured to direct the gases through an outlet port formed in the skid plate or belly pan;

wherein a door is connected to the skid plate or belly pan at a location that overlaps the outlet port, the door being movable from a closed position that obstructs the outlet port to an open position where the door does not obstruct the outlet port by an actuator in communication with the controller;

the controller is configured to communicate an instruction to the actuator to move the door from the closed position to the open position based on the signal indicative of the temperature or pressure within the housing received from the at least one sensor, the door includes a first panel attached to the skid plate or belly pan, the first panel including an opening that is aligned with the outlet port, the door includes a second panel attached to the first panel by a hinge, and the second panel includes a latching mechanism having a latch that is pivotably attached to the second panel and configured to pass through the outlet port and mate with the skid plate to maintain the door in the closed position.

2. The vehicle according to claim 1, wherein the at least one sensor is a temperature sensor configured to generate the signal indicative of the temperature within the housing.

3. The vehicle according to claim 2, further comprising a pressure sensor positioned in the housing that is configured to generate the signal indicative of the pressure within the housing.

4. The vehicle according to claim 1, wherein the actuator includes an actuator pin that is configured to contact the latch and disengage the latch from the skid plate to permit the door to move to the open position.

5. The vehicle according to claim 1, wherein when the door is in the open position, the door is configured as a shield that prevents or at least substantially minimizes the gases passing through the outlet port from travelling in a predetermined direction.

6. The vehicle according to claim 1, wherein a first coil spring is wound around the hinge that is configured to bias the second panel away from the outlet port.

7. The vehicle according to claim 1, wherein when the door is in the closed position that obstructs the outlet port, the door is configured to improve aerodynamic properties of the vehicle and prevent the outlet port from becoming clogged.

8. A method for permitting gases generated during a thermal runaway event to escape a battery pack of a vehicle that is located proximate a skid plate or belly pan of the vehicle, the method comprising:

communicating a signal indicative of a temperature or a pressure within the battery pack to a controller, the signal being generated by at least one sensor positioned within the battery pack;

determining with the controller, based on the signal indicative of the temperature or the pressure within the battery pack, whether at least one battery cell located in the battery pack is undergoing a thermal runaway event; and after determining with the controller that at least one battery cell located in the battery pack is undergoing the thermal runaway event, communicating an instruction from the controller to an actuator to open a door connected to the skid plate or belly pan of the vehicle;

wherein the battery pack includes a housing that includes at least one vent that is configured to permit gases generated by the at least one battery cell to escape the housing, and at least one manifold connected to the housing that is in fluid communication with the at least one vent and configured to direct the gases through an outlet port formed in the skid plate or belly pan;

the door is connected to the skid plate or belly pan at a location that overlaps the outlet port, and the door is movable by the actuator from a closed position that obstructs the outlet port to an open position where the door does not obstruct the outlet port, the door includes a first panel attached to the skid plate or belly pan, the first panel including an opening that is aligned with the outlet port, the door includes a second panel attached to the first panel by a hinge, and the second panel includes a latching mechanism having a latch that is pivotably attached to the second panel and configured to pass through the outlet port and mate with the skid plate to maintain the door in the closed position.

9. The method according to claim 8, wherein a first coil spring is wound around the hinge that is configured to bias the second panel away from the outlet port.

10. The method according to claim 8, wherein the actuator includes an actuator pin that is configured to contact the latch and disengage the latch from the skid plate to permit the door to move to the open position.

11. The method according to claim 8, wherein when the door is in the open position, the door is configured as a shield that prevents or at least substantially minimizes the gases passing through the outlet port from travelling in a predetermined direction.

12. The method according to claim 8, wherein the at least one sensor is a temperature sensor configured to generate the signal indicative of the temperature within the housing.

13. The method according to claim 12, further comprising a pressure sensor positioned in the housing that is configured to generate the signal indicative of the pressure within the housing.

14. The method according to claim 8, wherein when the door is in the closed position that obstructs the outlet port, the door is configured to improve aerodynamic properties of the vehicle and prevent the outlet port from becoming clogged.

* * * * *